US 6,590,677 B1

(12) United States Patent
Nakamura et al.

(10) Patent No.: US 6,590,677 B1
(45) Date of Patent: Jul. 8, 2003

(54) INFORMATION MANAGEMENT SYSTEM CAPABLE OF CONNECTING FACSIMILE MACHINES WHICH ARE INCOMPATIBLE WITH NETWORK SYSTEMS TO NETWORK SYSTEMS

(75) Inventors: Masahiro Nakamura, Yokohama (JP); Yoshio Kawajiri, Kanagawa (JP); Peter E. Hart, Menlo Park, CA (US)

(73) Assignee: Ricoh Co., Ltd., Yokohama (JP)

( * ) Notice: Subject to any disclaimer, the term of this patent is extended or adjusted under 35 U.S.C. 154(b) by 0 days.

(21) Appl. No.: 09/148,159

(22) Filed: Sep. 4, 1998

(30) Foreign Application Priority Data

Sep. 5, 1997 (JP) .............................................. 9-241085

(51) Int. Cl.[7] .......................... H04N 1/32; H04M 11/00
(52) U.S. Cl. ............. 358/442; 379/100.06; 379/100.12; 379/100.17

(58) Field of Search .................................. 358/400, 434, 358/402, 407, 440, 404, 405; 379/100.01, 100.06, 100.12, 100.17

(56) References Cited

U.S. PATENT DOCUMENTS

| | | | | | |
|---|---|---|---|---|---|
| 5,291,302 | A | * | 3/1994 | Gordon | 358/400 |
| 5,459,584 | A | * | 10/1995 | Gordon | 358/434 |
| 5,999,274 | A | * | 12/1999 | Lee | 358/434 |
| 6,023,470 | A | * | 2/2000 | Lee | 370/401 |
| 6,067,172 | A | * | 5/2000 | Yokoyama | 358/442 |

* cited by examiner

Primary Examiner—Jerome Grant, II
(74) Attorney, Agent, or Firm—Dickstein Shapiro Morin & Oshinsky, LLP

(57) ABSTRACT

The present invention is related to an information management system and device that makes it possible to connect the conventional facsimiles, to a network system such as a local area network (LAN).

37 Claims, 15 Drawing Sheets

| DOCUMENT NUMBER | SENDING SIDE | RECEIVING DATE | RECEIVING TIME | TOTAL PAGES |
|---|---|---|---|---|
| 1 | OSAKA BLANCH | '97.8.25 | 13:30 | 8 |
| 2 | IROHA ELECTRONICS | '97.8.26 | 10:40 | 2 |
| ⋮ | ⋮ | ⋮ | ⋮ | ⋮ |

FIG. 6

INFORMATION MANAGEMENT SYSTEM CAPABLE OF CONNECTING FACSIMILE MACHINES WHICH ARE INCOMPATIBLE WITH NETWORK SYSTEMS TO NETWORK SYSTEMS

FIELD OF THE INVENTION

This invention is generally related to a facsimile device and system and more particularly related to a information management device and system that makes it possible to connect conventional facsimile machines which are not able to connect to network systems such as a local area network (LAN), to network systems.

BACKGROUND OF THE INVENTION

Conventional facsimile machines directly receive facsimile information and then print the facsimile information on paper. Another type of facsimile machine has a confidential function and temporally stores the received information in a memory. In a facsimile machine having a confidential function, if the user wants to print the received confidential information on paper, the user has to input their password or identification number to the facsimile machine. When the inputted password matches a stored one, the facsimile machine produces a printed output corresponding to the facsimile information.

In either case, the user or facsimile operator had to go to the place at which the facsimile machine is located when they wanted to receive or send facsimile information. These types of facsimile machines are inconvenient for a user.

One conventional solution to solving the above problem attempts to employ a Local Area Network (LAN) facsimile network or a facsimile server.

Referring to FIG. 1, Japanese Laid Open patent application 8-204,934 discloses a facsimile machine and system designed specifically for a LAN. The facsimile is connected with the LAN. Accordingly, devices connected with the LAN are capable of gaining access to the files in the LAN facsimile machine via the LAN.

FIG. 2 shows a system described in Japanese Laid Open patent application 3-289,756 which discloses a system employing a facsimile server. The facsimile server 110 connects a public switched telephone network (PSTN) 100 to a LAN 122, receives the information from the sending side, and stores the information in memory 114. Each device connected with the LAN 122 is capable of gaining access to the stored information in the memory 114 by way of the LAN 112. As well known, a LAN is typically a digital network.

However, as recognized by the present inventor, the LAN facsimile machine and the above facsimile server have to be connected with the LAN. Generally, the LAN facsimile or the facsimile server have multiple functions but are very expensive.

Many users have a conventional facsimile machine which is incompatible with a digital network system. Generally, the conventional facsimile machines are inexpensive and only have user-friendly simple functions.

Therefore, the users, which get accustomed to the conventional facsimile machine, want to use the existing facsimile machine with a network system without change. However, the above users can not use the conventional incompatible facsimile machine in a network system.

In addition, connecting the LAN facsimile machine and the facsimile server to the LAN takes much time and labor.

If the user who has a conventional facsimile machine would like to employ it for a network system, the user has to replace and connect an adaptable expensive LAN facsimile machine or a facsimile server with an additional considerable expense in time and effort.

Furthermore, in such a case, the existing conventional incompatible facsimile machine becomes useless.

SUMMARY OF THE INVENTION

The device and system according to the present invention is capable of connecting a conventional incompatible facsimile machine to a network system, for example, a digital LAN.

To solve the above and other problems, according to one aspect of the present invention, a facsimile information management system is provided which is capable of connecting conventional facsimile machines, which are incompatible with network systems, to network systems. The facsimile information, management system includes a facsimile information management device connecting the facsimile machine and the network systems, and configured to manage information corresponding to facsimile transmissions and convert that information to information which is compatible with a network system.

According to another aspect of the present invention, the facsimile information management device temporally captures a signal stream corresponding to a facsimile transmission between the facsimile machines via a network system, and stores the information corresponding to the captured signal stream.

According to another aspect of the present invention, the facsimile information management device monitors a stream of facsimile transmissions between the facsimile machines via a network system, and transfers all or a part of the stream of the facsimile transmission to a server device via the network system.

BRIEF DESCRIPTION OF THE DRAWINGS

The above and other aspects and further features of the present invention will become more apparent from the following detailed description which is provided in conjunction with the accompanying drawings, wherein:

FIG. 6 is a table content of the management report contained in management information storage according to the present invention;

DESCRIPTION OF THE PREFERRED EMBODIMENT

Figure 1:
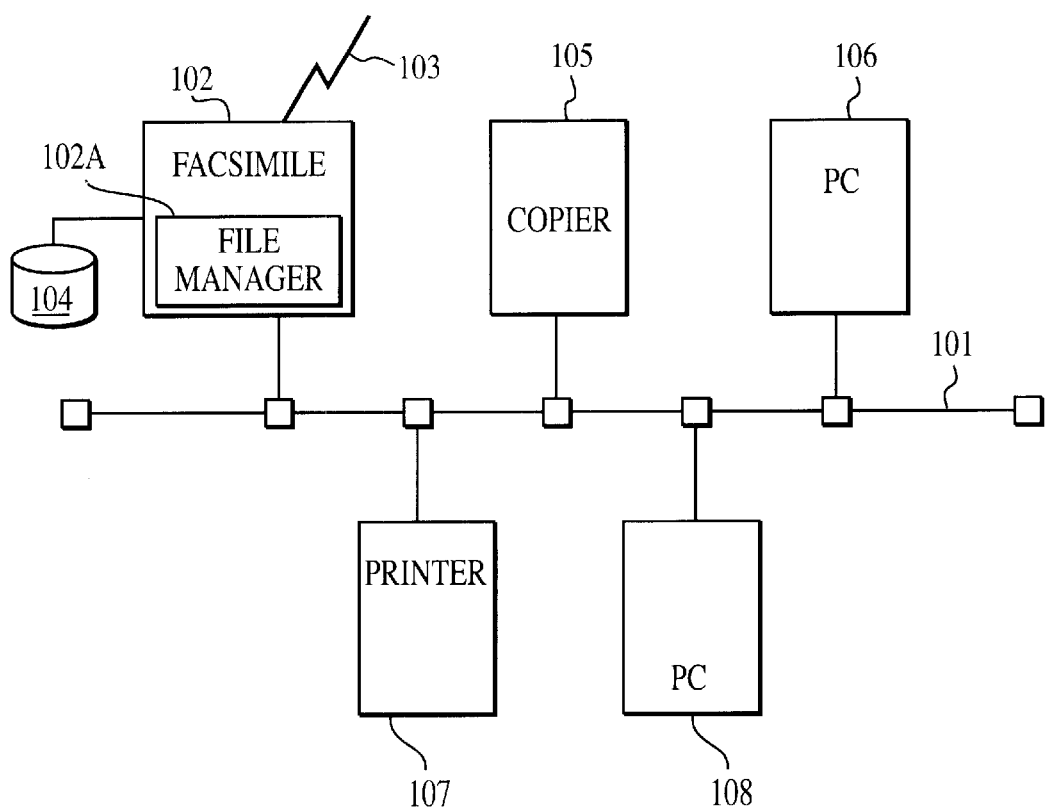
FIG. 1 is a block diagram illustrating a conventional LAN facsimile machine as described in Japanese Laid Open patent application 8-204,934.
Figure 2:
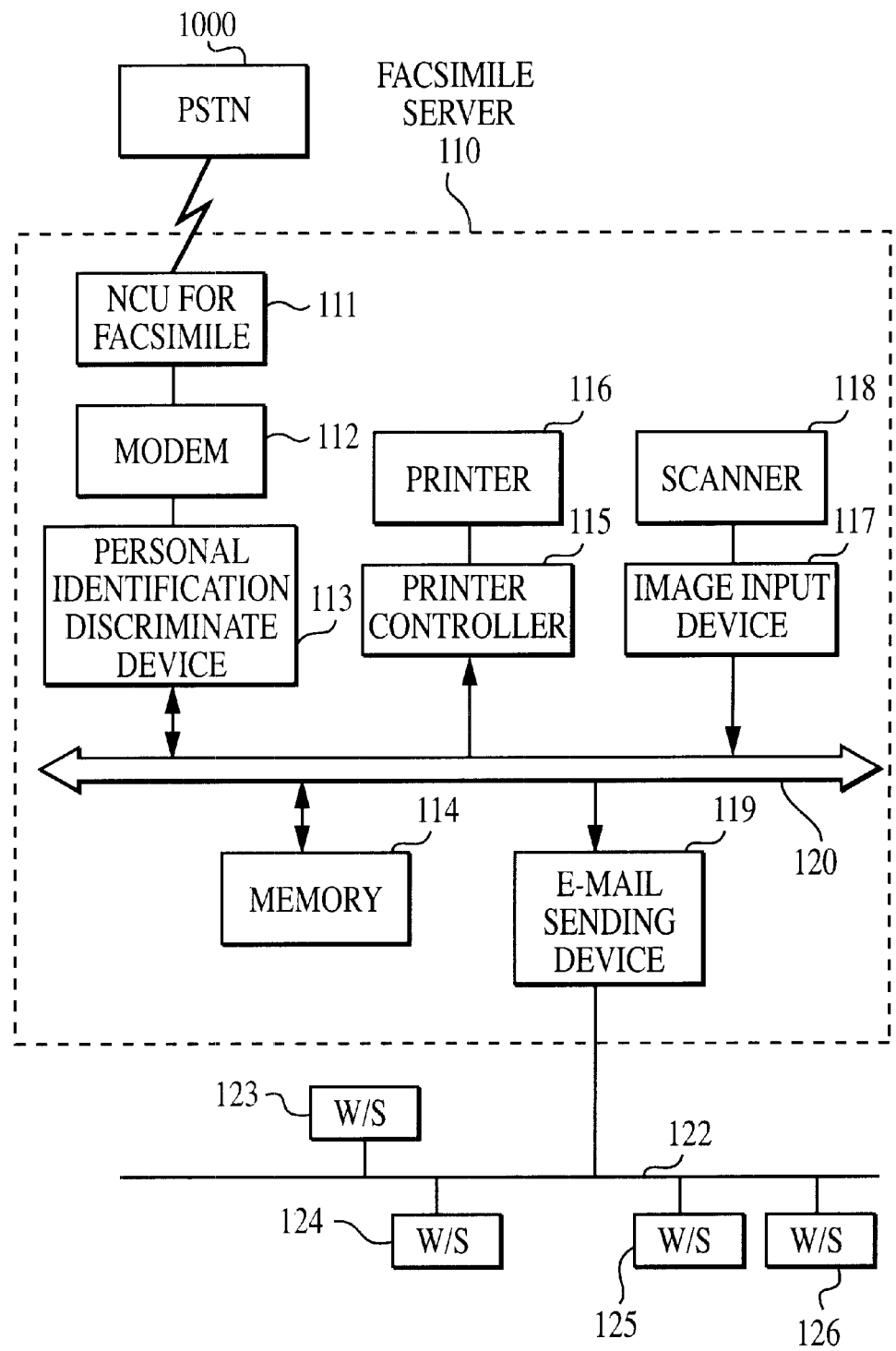
FIG. 2 is a block diagram illustrating a conventional facsimile server as described in Japanese Laid Open patent application 3-289756.
Figure 3:
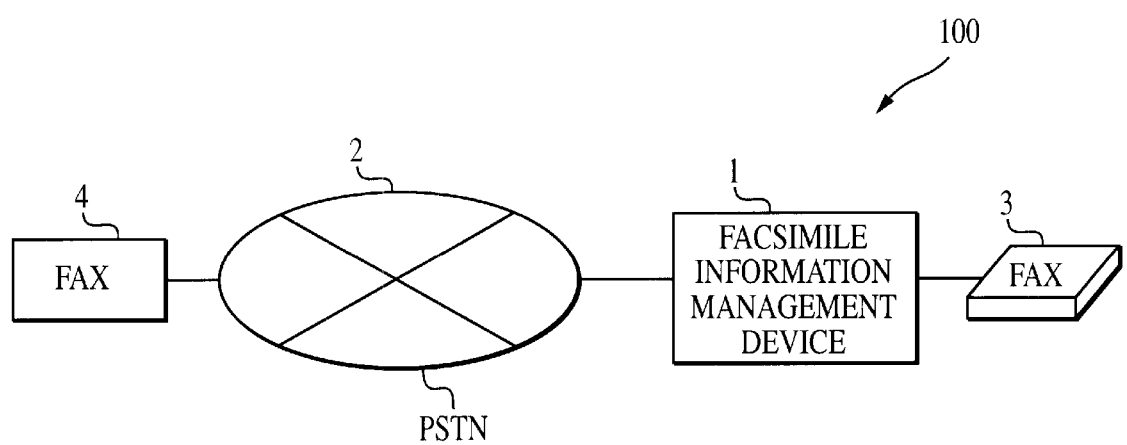
FIG. 3 is a block diagram of a facsimile system which has a facsimile information management device according to the first embodiment of the present invention.
Figure 4:
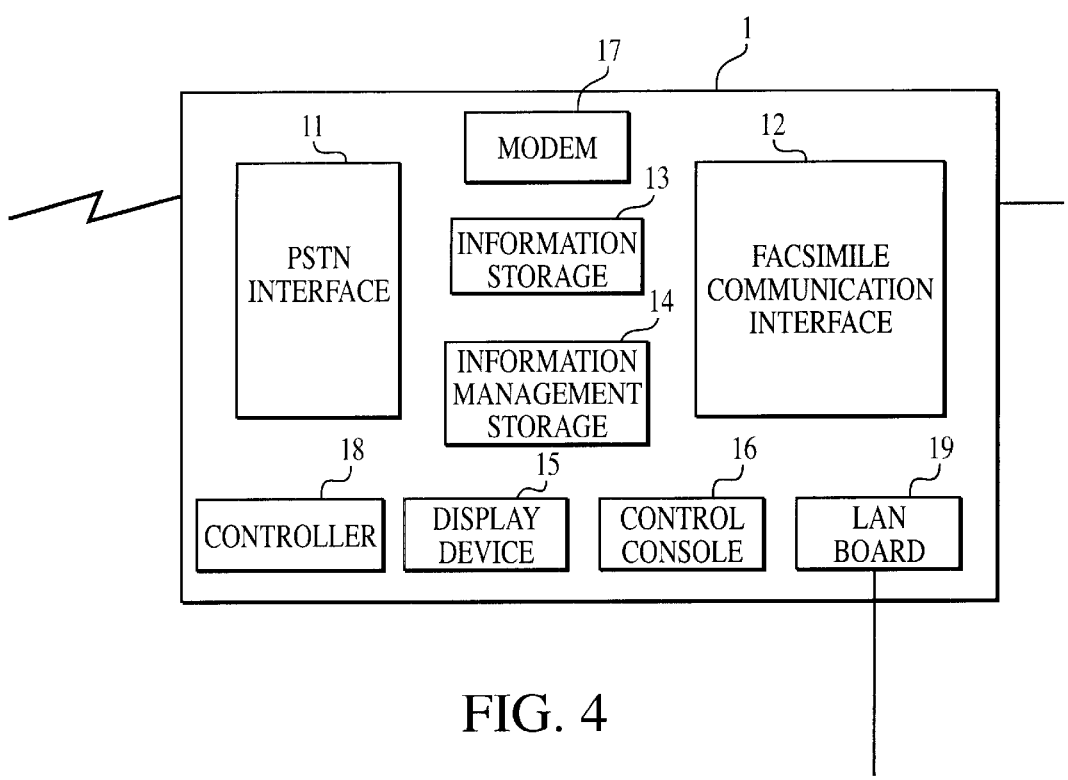
FIG. 4 is a detail block diagram of the facsimile information management device according to the first embodiment of the present invention.

FIGS. 3 and 4 show a first embodiment of a facsimile system in which a facsimile information management device 1 in accordance with the invention is used. FIG. 3 shows that the facsimile system 100 includes a facsimile information management device 1, a PSTN 2, a conventional facsimile machine 3 incompatible for network system and the other side facsimile machine 4.

Referring to FIG. 4, the facsimile information management device 1 captures either management information from the facsimile transmission between facsimile machines 3 and 4 or the information corresponding to the entire facsimile transmission.

As shown in FIG. 4 the facsimile information management device 1 is made up of a PSTN interface 11, a facsimile communication interface 12, an information storage device 13, an information management storage device 14, a display device 15, a control console 16, a facsimile modem 17, a controller 18 and a LAN board 19.

The PSTN interface 11 is an interface device between the PSTN 2 and the facsimile information management device 1. The PSTN interface 11 communicates with facsimile machine 4 via the PSTN 2. The facsimile communication interface 12 is also an interface device between the conventional incompatible facsimile machine 3 and the facsimile information management device 1 and carries out the function of sending and receiving information to and from facsimile machine 3. The facsimile modem 17 demodulates the information received from the PSTN interface 11 and also modulates the information between the facsimile 3 and the facsimile communication interface 12.

The information storage device 13 stores the demodulated information that the facsimile information management device 1 receives from the facsimile machine 3 or the PSTN 2. The demodulated information is, for example, fax image data and so on. The information management storage 14 stores and makes a management report of the facsimile information stored in the information storage 13. The management report keeps a log of each facsimile transmission including such information as telephone number, transmission date or time, and whether the communication succeeded or failed. In other words, the management report keeps supervisory data concerning facsimile transmissions.

The display device 15 displays the management information kept in the information management storage 14 and the facsimile information kept in the information storage 13. The control console 16 is a console by which the user inputs commands to control the facsimile information management device 1.

Still referring to FIG. 4, when the facsimile machine 3 is receiving, the PSTN interface 11 receives the facsimile information from the sending side via the PSTN 2 and then the received facsimile information is temporally captured into the information storage 13 and the management information for the received facsimile is temporally captured into the information management storage 14.

Figure 5:
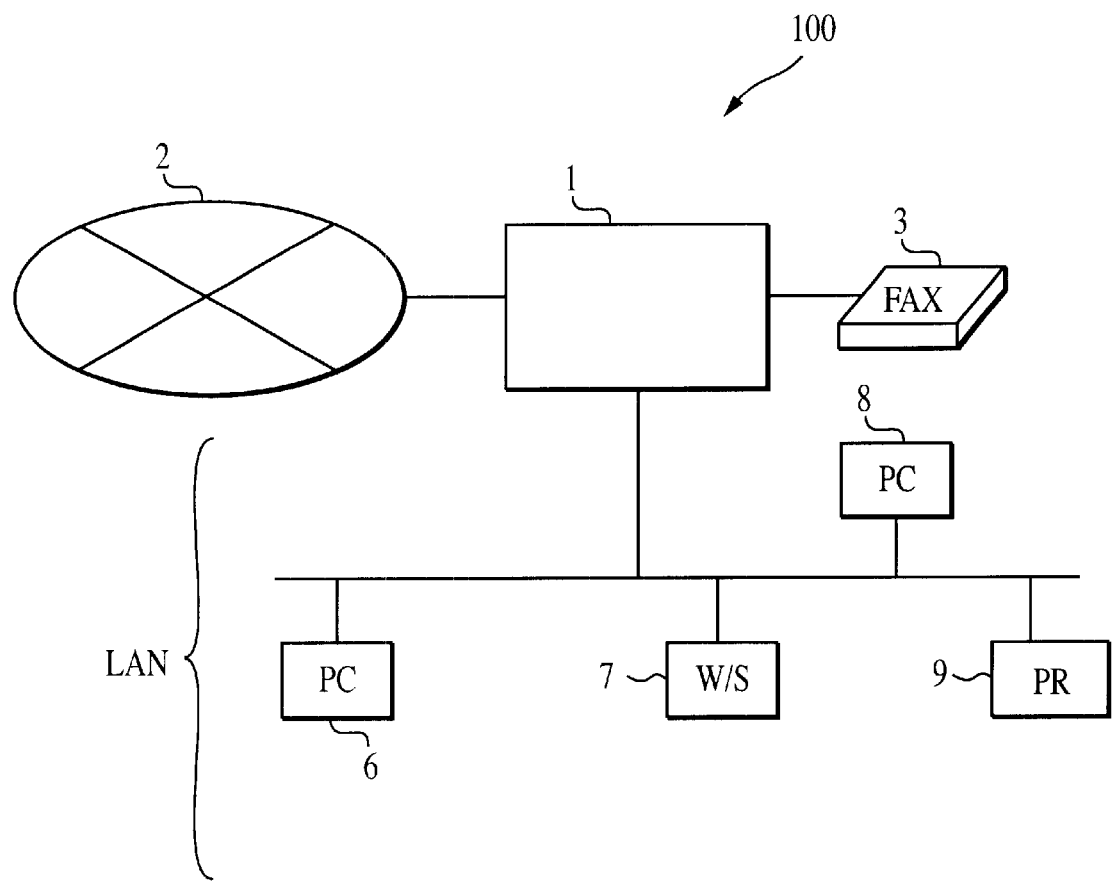
FIG. 5 is a block diagram of a facsimile system that has the facsimile information management device according to the first embodiment of the present invention.

Now referring to FIG. 5, the facsimile information management device 1 is connectable to network system such as LAN with the LAN board 19.

A personal computer (PC) connected to the LAN can gain access to the information captured in the information storage 13 and the information management storage 14 via the LAN board 19. Therefore, a PC is capable of taking advantage of the information from the conventional incompatible facsimile machines 3 by way of a network system.

Furthermore, the facsimile system 100 is also capable of reproducing the information captured in the information storage 13 and the information management storage 14.

The above mentioned process is regulated by the controller 18 based upon a program stored in a memory device such as a ROM.

Now referring to FIG. 6, when the facsimile machine 3 is on the receiving side, the management information is stored in a management report with the management information storage 14. The management report displays management information such as the telephone number of the sending or receiving sides or the date and time of receipt, and other supervisory information. The management report prepares a management record for every document. After the management record is stored in management information storage 14, it may be referred to during a search. The data content of each record is preferably of a fixed length.

Figure 7:
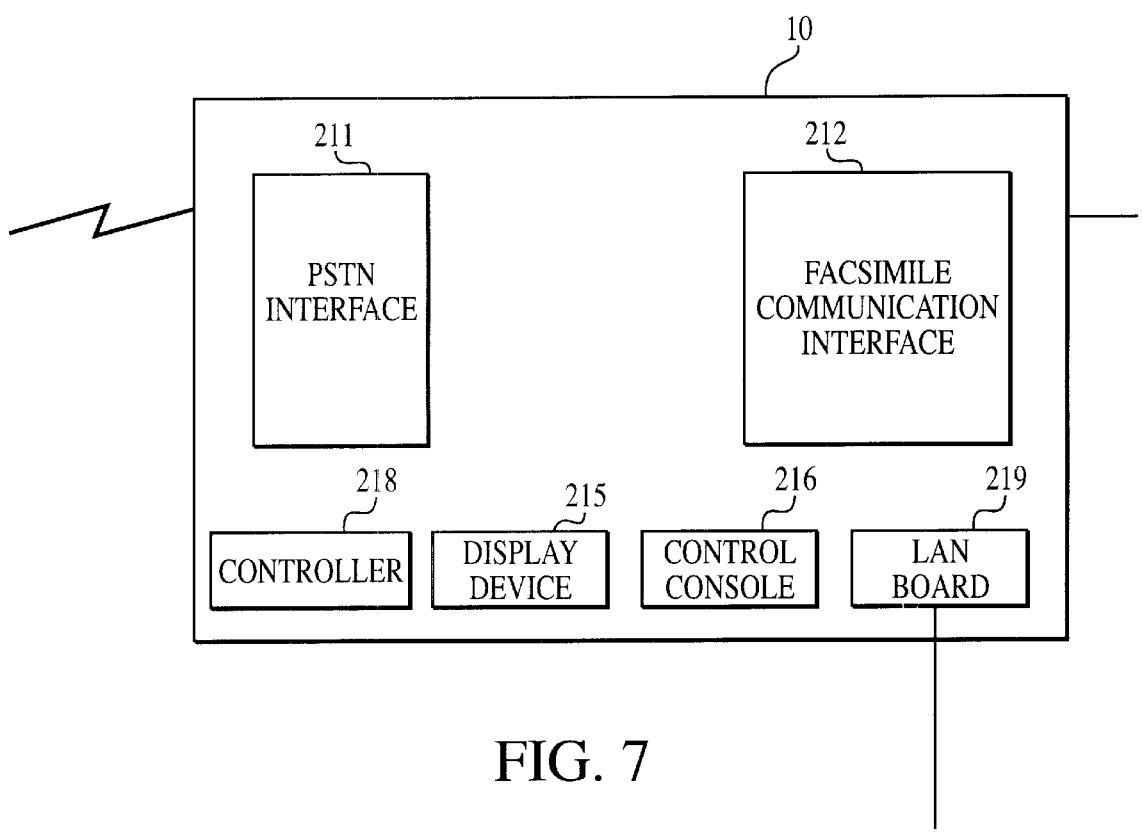
FIG. 7 is a block diagram of a facsimile information management device according to the second embodiment of the present invention.

FIG. 7 shows a second embodiment wherein the facsimile information management device 10 monitors a signal stream of facsimile transmission information between conventional facsimile machines via a network system.

The facsimile information management device 10 is made up of a PSTN interface 211, a facsimile communication interface 212, a display device 215, a control console 216, a controller 218 and a LAN board 219.

An explanation of the above device is omitted because of its similarity to the device described with respect to the first embodiment.

The facsimile information management device 10 is not equipped with an information storage device and an information management storage device as in the first embodiment. The facsimile information management device 10 only monitors the facsimile transmission between the PSTN 2 and the facsimile machine 3.

Figure 8:
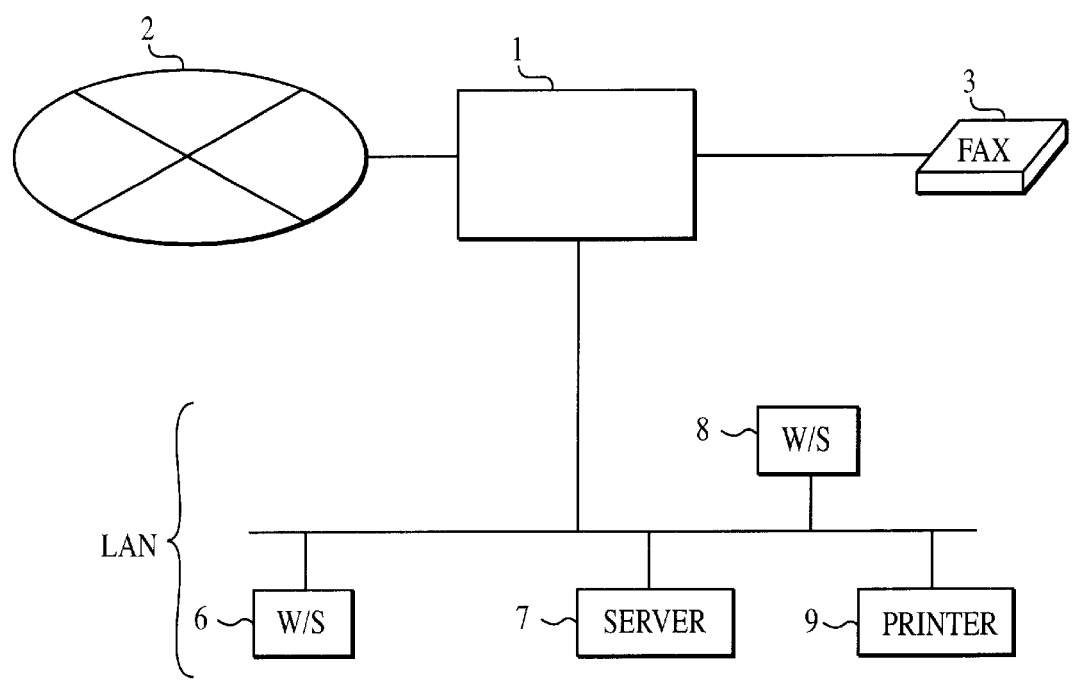
FIG. 8 is a block diagram of a facsimile system which has a facsimile information management device according to the second embodiment of the present invention.

Now referring to FIG. 8, the monitored facsimile transmission is sent to a server device via the LAN board 219 and a LAN. The facsimile transmission is demodulated by the server and stored in the server device. In other words, the server device has storage devices corresponding to the information storage and the information management storage of the first embodiment. These storage devices also have the same function as the information storage and the information management storage devices of the first embodiment.

As described in the first embodiment, the stored facsimile transmission may be reused to produce another facsimile transmission. The server device also stores the management report which is described above.

Figure 9:
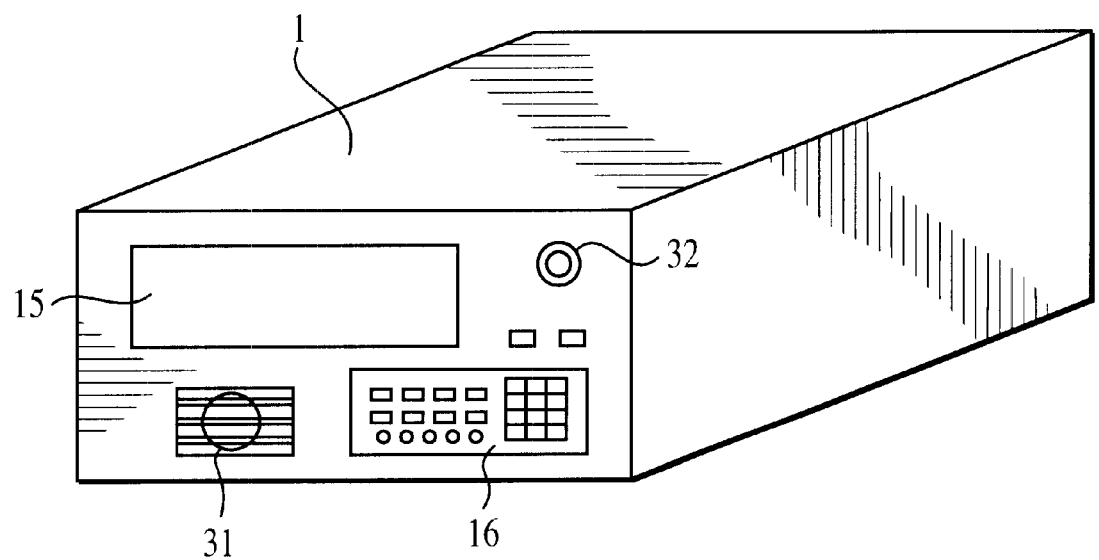
FIG. 9 is a perspective view of the facsimile information management device according to the present invention.

Now referring FIG. 9, when the facsimile information is stored, the display 15 displays a part of the facsimile information or the management information. Accordingly, the user is capable of verifying the receipt of the facsimile information by the display 15. If the user needs to access the displayed facsimile information, the user inputs commands through control console 16 to either print out facsimile information from facsimile machine 3 on paper or to abandon it.

A facsimile information management device 1 is also capable of storing the facsimile information in the information storage 13 after printing the facsimile information on the paper. The facsimile system described may be constructed to selectively store all or any part of the information received with an incoming facsimile transmission, the facsimile system equipped with a switching device to determine which is selectively stored.

Still referring to FIG. 9, the facsimile information management device 1 may be equipped with a beeper 31 and an indicator light source 32. The beeper 31 generates a sound signal or a beep when the facsimile information management device 1 is receiving facsimile information or stores the facsimile information in the information storage 13. Similarly, the indicator 32 indicates that the facsimile information management device 1 receives the facsimile information by emitting light.

In other words, when the facsimile information management device 1 receives facsimile information, the beeper 31 generates a beep and the indicator 32 emits light to indicate that the facsimile information management device 1 has received the facsimile information and the received facsimile information is stored. The beeper 31 sounds a beep for a predetermined time interval at the instant the facsimile information management device 1 receives incoming facsimile information.

The beeper 31 stops generating the beep for a predetermined time interval. However, the indicator 32 continues to be lit until the facsimile information management device 1 has finished storing the facsimile information. The user need not keep watch on the facsimile management device 1. The user can confirm whether or not the facsimile information management device 1 has received facsimile information by the light from the indicator 32 or the beep sound from the beeper 31.

Figure 10:
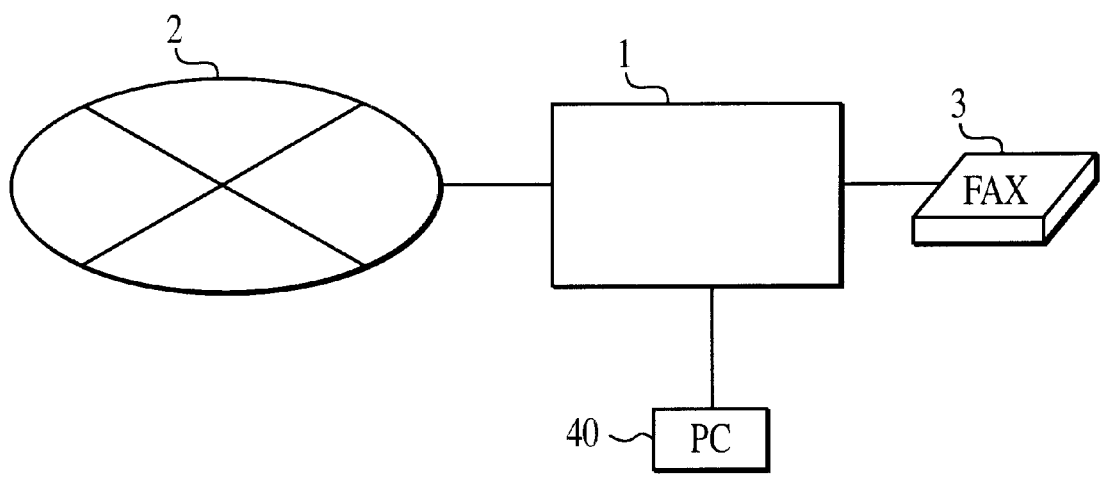
FIG. 10 is a block diagram of a revised facsimile system that has the facsimile information management device according to the present invention.

Now referring to FIG. 10, the facsimile information management device 1 is capable of connecting to a personal computer (PC) 40. When the PC 40 is connected to the facsimile information management device 1, this facsimile system is capable of carrying out an operation by a keyboard or a mouse which is connected to the PC 40, instead of the attached control console 16 of the facsimile information management device 1. Furthermore, the facsimile system is also capable of displaying the facsimile information on the display of the PC 40, in addition to or instead of the attached display of the facsimile information management device 1.

Of course, the facsimile information management device 1 does not need the beeper 31 and the indicator 32. The user can keep watch and check the facsimile information or facsimile management information stored in the information storage 13 and in the information management storage 14 on the display of the PC 40.

The above facsimile system has the advantage that the user can clearly discover the facsimile information or facsimile management information because of the large screen display of the PC 40 in comparison with the attached display 15 of the facsimile information management device 1.

The PC 40 may be used to selectively choose any facsimile information based upon the displayed list of the received facsimile information on the display of the PC 40.

Figure 11:
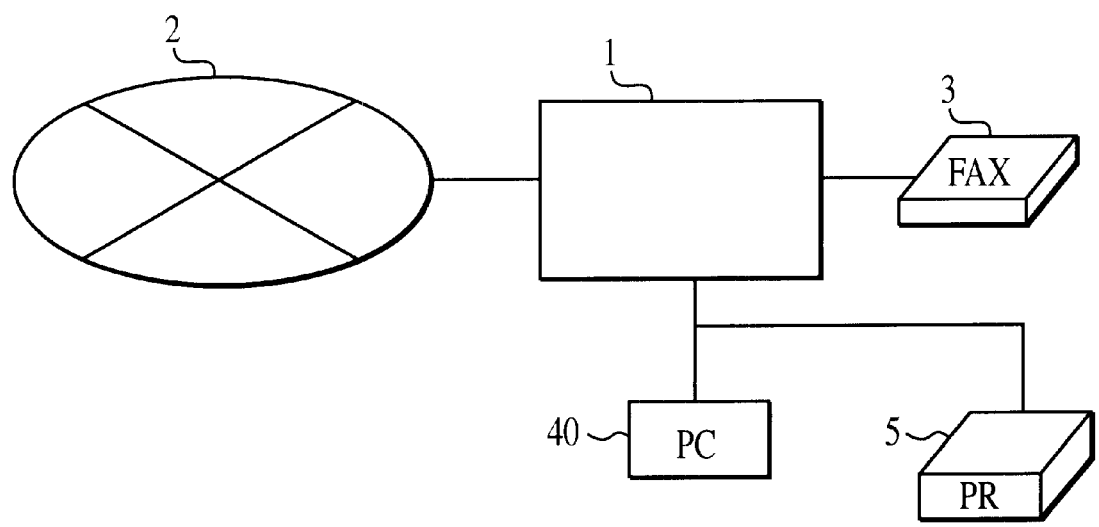
FIG. 11 is a block diagram of another revised facsimile system that has the facsimile information management device according to the present invention.

Now referring to FIG. 11, the facsimile system is also capable of connecting to a printer 5.

In the case that the printer 5 is connected to the facsimile system, the facsimile system may print the facsimile information either on the printer 5 or the facsimile machine 3.

The facsimile information may be printed out when the facsimile information management device 1 receives the facsimile information, when the control console 16 is operated, or when the keyboard of the PC 40 is operated.

The facsimile system allows printing to occur at a user determined time or date and allows the user to print the facsimile information, the facsimile management information, or both.

Now referring FIG. 3 and 4 again, when the facsimile machine 3 is the sending side the facsimile communication device 12 of the facsimile information management device 1 receives the facsimile information from the facsimile machine 3. The received facsimile information is stored in the information storage 13. Subsequently the facsimile management information such as the telephone number of the receiving side and the sending date is stored within the management information storage 14. The facsimile information management device 1 sends the received facsimile information to the receiving side by way of the PSTN interface 11 and the PSTN 2.

The captured facsimile information and facsimile management information similarly are reproducible. Therefore, the facsimile system is capable of sending a facsimile in which the phone number of the receiving side has been captured in the management information storage 14 and is then attached with the facsimile information received from the facsimile machine 3. The system may also send a facsimile which has the same contents as the captured facsimile information in the information storage 13 added to the facsimile information received from the facsimile 3.

The facsimile system can also attach the captured facsimile information or the captured facsimile management information to the facsimile information received from the sending side.

Figure 12:
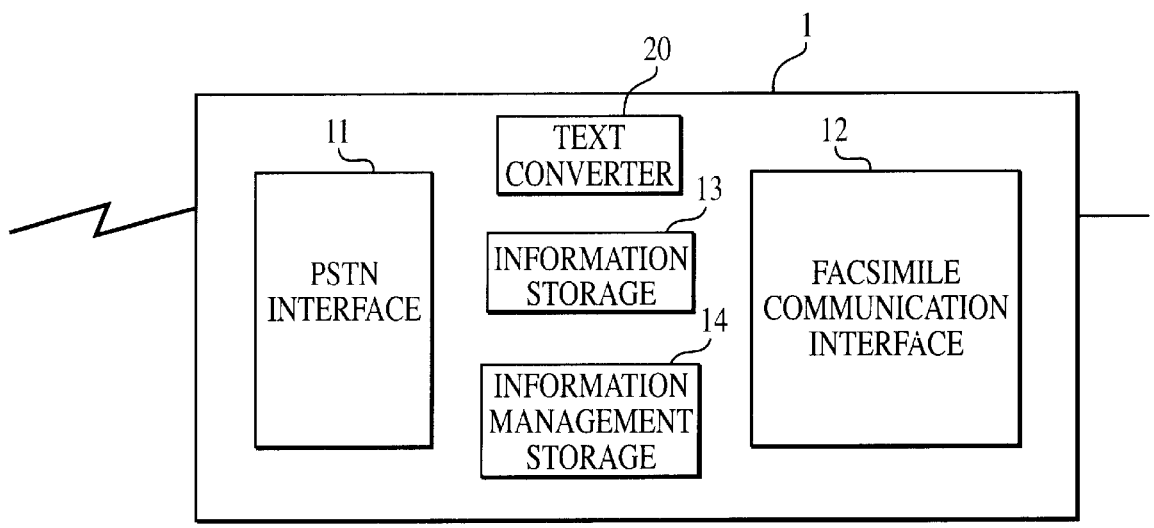
FIG. 12 is a block diagram of the facsimile information management device according to the third embodiment of the present invention.

Now referring to FIG. 12, the facsimile information management device 1 may also be contain a text converter 20. The text converter 20 converts the facsimile information into text data. In the facsimile information management device 1, the information storage 13 stores the converted text data.

Figure 13:
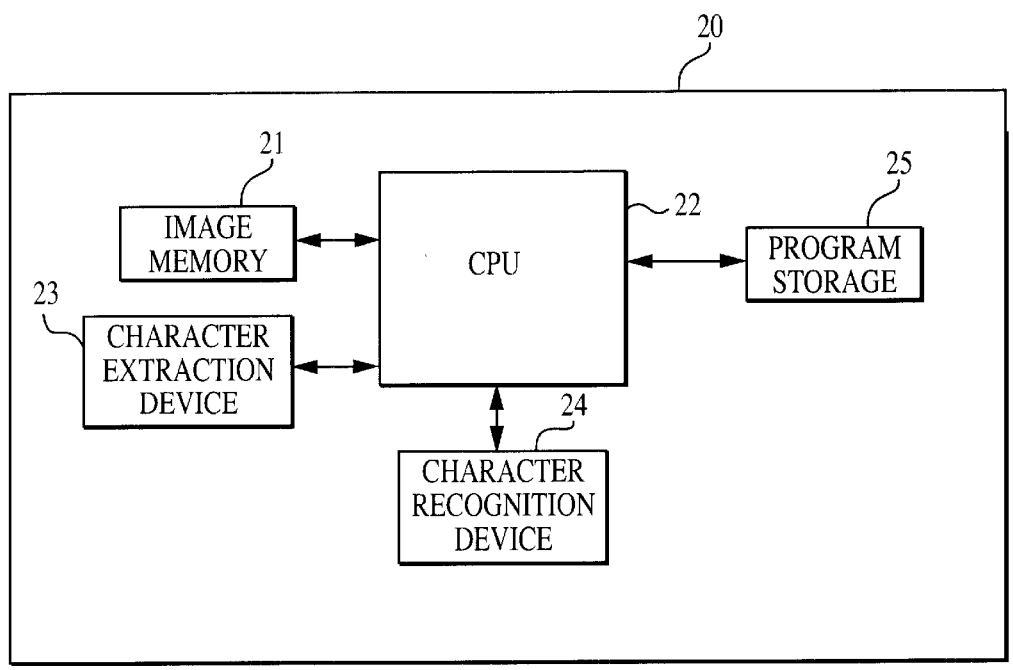
FIG. 13 is a detail block diagram of an information converter in the facsimile information management device according to the third embodiment of the present invention.

Referring to FIG. 13, the text converter 20 is made up of an image memory 21, a CPU 22, a character extraction device 23, a character recognition device 24, and a program storage 25.

The image memory 21 stores the image data corresponding to the received facsimile information. The CPU 22 carries out the program stored in the program storage 25 and controls the conversion process. The character extraction device 23 extracts a portion of the image of the received facsimile information from the memory space. The character recognition device 24 carries out the character recognition for the data extracted by the character extraction device 23 and outputs the code data corresponding to the extracted data. The program storage 25 stores the program for carrying out the conversion process.

Figure 14:
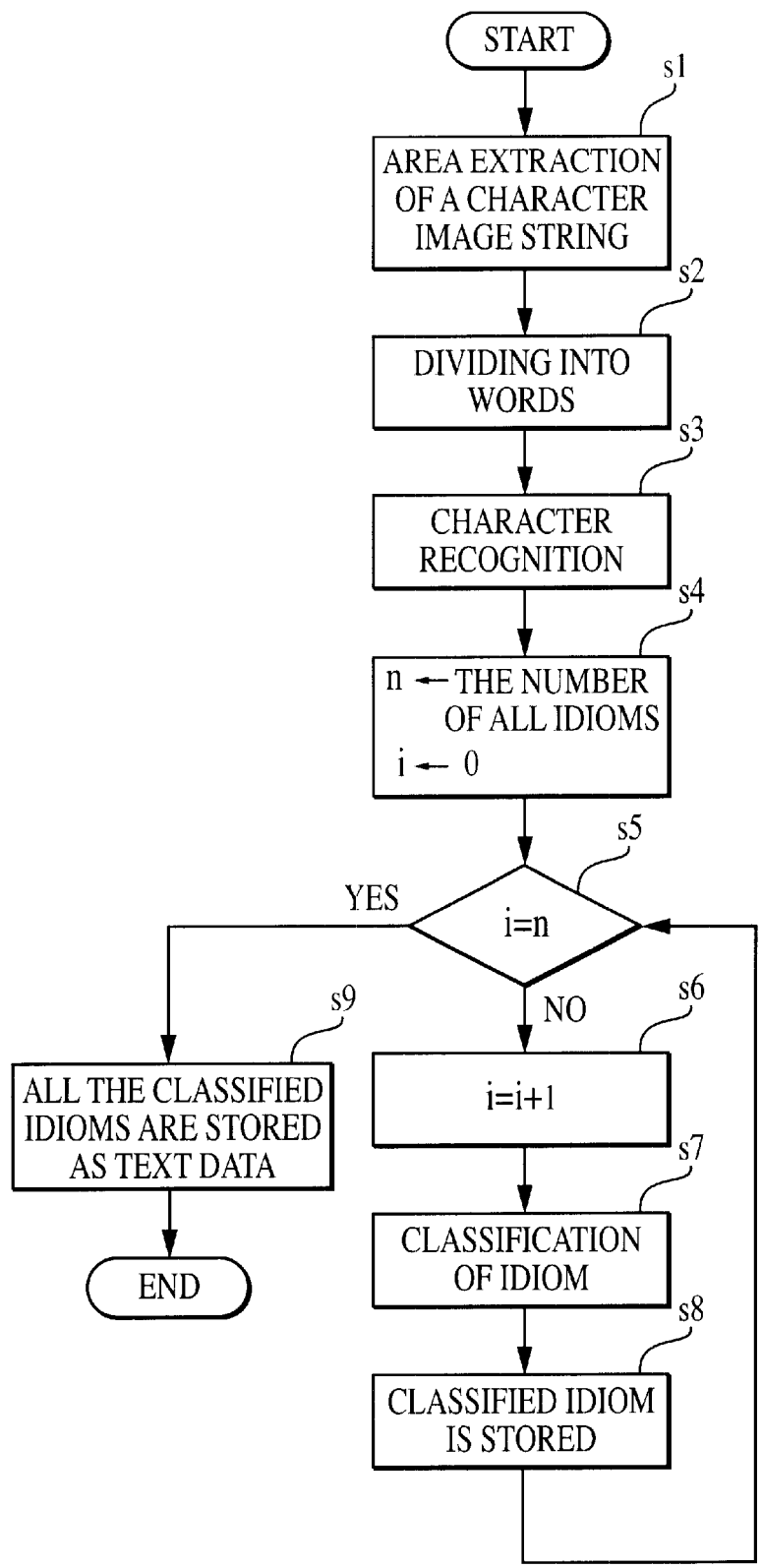
FIG. 14 is a flow chart of a process flow of the character recognition which an information converter carries out according to the second embodiment of the invention.

FIG. 14 shows a flow chart that illustrates the respective steps employed as part of the text conversion process.

Step S1 shows an area extraction of a character image string is carried out. The process proceeds to step S2 where the extracted character image string is divided into words separated with a blank. The process proceeds to step S3, the character recognition is carried out for each word. In step S4 the number of all words is assumed to "n". In step S5 the device determines whether classification of an idiom to each word is finished or not. If the classification of an idiom is not finished for each word, the process proceeds to step S7 via step S6 and the classification of an idiom is carried out in Step S7. In step S8, the classified idiom is stored.

If the classification of an idiom to each word is finished, the process proceeds to step S9. All classified idioms are stored as text data in step S9.

Thereafter, the document data that was transformed to text data is handled similarly to facsimile information.

Accordingly, the volume of data stored in the information storage 13 becomes small. The facsimile system is, therefore, also capable of reducing the transmission time of the facsimile information.

Japanese Laid Open patent application 6-291,897 discloses the details of above process. The entire contents of this published patent application are incorporated herein by reference.

Figure 15:
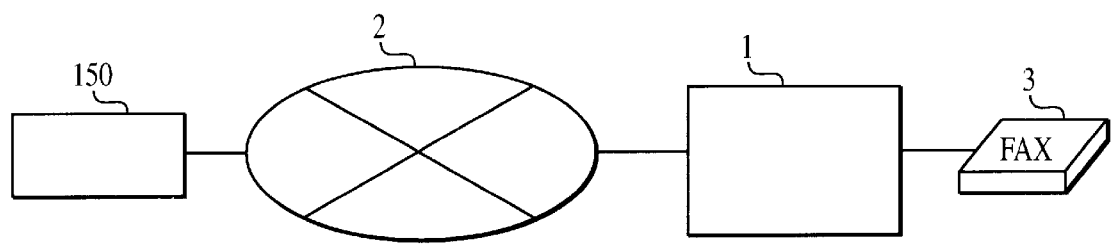
FIG. 15 is a block diagram of a facsimile system in which a personal digital assistant (PDA) is used according to the present invention.

Now referring to FIG. 15, the facsimile system is also capable of being connected to a personal digital assistant (PDA) 150. The user connects the PDA 150 to the PSTN 2 and can gain access to the facsimile by way of the LAN or the facsimile information management device 1 of the present invention.

It is to be understood, however, that even though numerous characteristics and advantages of the present invention have been set forth in the foregoing description, together with details of the structure and function of the invention, this disclosure is illustrative only, and changes may be made in detail, especially in matters of shape, size and arrangement of parts, as well as implementation in software, hardware, or a combination of both within the principles of the invention to the full extent indicated by the broad general meaning of the terms in which the appended claims are expressed.

The present document incorporates by reference the entire contents of Japanese priority document, 09-241,085 filed in Japan on Sep. 5, 1997.

What is claimed is:

1. An apparatus for connecting a telephone line-connectable facsimile machine to a digital network and to a telephone line, said apparatus comprising:

a telephone line communications interface for connecting said apparatus with said telephone line;

a facsimile machine communications interface for connecting said apparatus with said facsimile machine;

a first memory storage for storing a facsimile transmission image sent from or to said facsimile machine communications interface;

a second memory storage for storing facsimile transmission management information associated with said facsimile transmission image;

a facsimile modem for sending/receiving facsimile transmissions to and from said telephone line through said telephone line communications interface;

a digital communications interface for connecting said apparatus with said digital network; and a controller for controlling user-defined options for the operation of said interfaces, said first and second memory storages and said modem to enable said facsimile machine connected to said apparatus to send and receive facsimile transmissions over said telephone line and to send said facsimile transmission image and facsimile transmission management information to said digital communications interface; and wherein said controller further comprises a digital signal processing unit dedicated to performing optical character recognition on said incoming facsimile transmission image for converting said facsimile transmission image to digital text data.

2. The apparatus of claim 1, wherein said digital text data is stored in said first memory storage.

3. The apparatus of claim 1, wherein said controller comprises at least a processing unit, a command console, and a display device.

4. The apparatus of claim 3, wherein said command console comprises a plurality of buttons for selecting said user-definable options for control of said apparatus.

5. The apparatus of claim 3, wherein said display device comprises a screen capable of displaying information relating to said user-definable options.

6. The apparatus of claim 3, wherein said display device comprises a light and a sound producing device connected to said processing component which are activated when an incoming facsimile signal is detected and deactivated when said facsimile transmission image and said facsimile management information have been stored in said first and second memory devices.

7. The apparatus of claim 1, wherein said controller comprises at least a processing unit, a digital interface, and a computer.

8. The apparatus of claim 7, wherein said computer includes a personal computer and software for entering instructions relating to said user-definable options and for the display of information relating to said facsimile management information.

9. The apparatus of claim 1, wherein said user-defined options include allowing a user to change the site where said facsimile transmission image and/or said facsimile information management information is to be delivered.

10. The apparatus of claim 1, wherein said user-defined options include allowing a user to determine which data to include in said facsimile management information.

11. The apparatus of claim 1, wherein said facsimile transmission management information includes the time and date of receipt of a facsimile transmission.

12. The apparatus of claim 1, wherein said facsimile transmission management information includes the address of the origin, intended destination, and actual destination of a facsimile transmission.

13. The apparatus of claim 1, wherein said facsimile transmission management information includes the transmission protocol associated with a facsimile transmission.

14. The apparatus of claim 1, wherein said facsimile transmission management information includes an indicator of whether transmission of said facsimile transmissions were successful.

15. The apparatus of claim 1, wherein said first memory storage stores a facsimile transmission image sent from or to said facsimile machine communications interface for later selective retrieval.

16. The apparatus of claim 1, wherein said second memory storage stores facsimile transmission management information associated with said facsimile transmission image for later selective retrieval.

17. The apparatus of claim 1, wherein said digital communications interface includes a digital network interface and a computer.

18. The apparatus of claim 17, wherein said computer includes a digital network server.

19. The apparatus of claim 17, wherein said computer includes a digital personal computer.

20. The apparatus of claim 1, wherein said digital communications interface includes a digital network interface and a printing device.

21. The apparatus of claim 1, wherein said digital communications interface includes a personal digital assistant.

22. An apparatus for connecting a telephone line-connectable facsimile machine to a digital network and to a telephone line, said apparatus comprising:

a telephone line communications interface for connecting said appparatus with said telephone line;

a facsimile machine communications interface for connecting said apparatus with said facsimile machine;

a facsimile modem for sending/receiving facsimile transmissions to and from said telephone line through said telephone line communications interface;

at least a first memory storage for storing data corresponding to a facsimile image transmission sent from or to said facsimile machine communications interface;

a digital communications interface for connecting said apparatus with said digital network; and a controller for controlling user-defined options for the operation of said interfaces, said at least a first memory storage and said modem to enable said facsimile machine connected to said apparatus to send and receive a facsimile image transmission over said telephone line and to send said facsimile transmission being stored by said at least a first memory storage to said digital network;

wherein said controller comprises at least a processing unit, a command console, and a display device; and wherein said controller is further comprised of a digital signal processing unit dedicated to performing optical character recognition on said incoming facsimile transmission image for converting said facsimile transmission image to digital text data.

23. The apparatus of claim 3, wherein said digital text data is stored in said first memory storage.

24. The apparatus of claim 22, wherein said controller comprises at least a processing unit, a command console, and a display device.

25. The apparatus of claim 24, wherein said command console comprises a plurality of buttons corresponding to said user-definable options for control of said apparatus.

26. The apparatus of claim 24, wherein said display device comprises a screen capable of displaying information relating to said user-definable options.

27. The apparatus of claim 24, wherein said display device comprises a light and a sound producing device connected to said processing unit which are activated when an incoming signal is detected and deactivated when the signal has been stored in said first memory device.

28. The apparatus of claim 22, wherein said controller comprises at least a processing unit, a digital interface, and a computer.

29. The apparatus of claim 28, wherein said computer includes a personal computer and software for entering instructions relating to said user-definable options and for the display of information relating to said user-definable options.

30. The apparatus of claim 22, wherein said first memory storage memory storage allowing later selective retrieval of stored data.

31. The apparatus of claim 22, wherein said digital communications interface includes a digital network interface and a computer.

32. The apparatus of claim 31, wherein said computer includes a digital network server.

33. The apparatus of claim 31, wherein said computer includes a personal computer.

34. The apparatus of claim 22, wherein said digital communications interface includes a digital network interface and a printing device.

35. The apparatus of claim 22, wherein said digital communications interface includes a facsimile machine communications interface and a facsimile machine.

36. The apparatus of claim 22, wherein said digital communications interface includes a telephone line communications interface for connection with a telephone line.

37. The apparatus of claim 22, wherein said digital communications interface includes a telephone line communications interface and a personal digital assistant.

* * * * *